May 2, 1961 W. J. CADDEN ET AL 2,982,953

CODE TRANSLATOR

Filed Oct. 6, 1955 5 Sheets-Sheet 1

INVENTORS W. J. CADDEN
B. OSTENDORF, JR.
BY

ATTORNEY

INVENTORS W. J. CADDEN
B. OSTENDORF, JR.
BY [signature]
ATTORNEY

May 2, 1961 W. J. CADDEN ET AL 2,982,953

CODE TRANSLATOR

Filed Oct. 6, 1955 5 Sheets-Sheet 3

INVENTORS W. J. CADDEN
B. OSTENDORF, JR.
BY
ATTORNEY

INVENTORS W. J. CADDEN
B. OSTENDORF, JR.
BY
ATTORNEY

May 2, 1961 W. J. CADDEN ET AL 2,982,953

CODE TRANSLATOR

Filed Oct. 6, 1955 5 Sheets-Sheet 5

INVENTORS W. J. CADDEN
B. OSTENDORF, JR.
BY
ATTORNEY 2,982,953

CODE TRANSLATOR

William J. Cadden, Madison, N.J., and Bernard Ostendorf, Jr., Stamford, Conn., assignors to Bell Telephone Laboratories, Incorporated, New York, N.Y., a corporation of New York Filed Oct. 6, 1955, Ser. No. 538,888
10 Claims. (Cl. 340—347)

This invention relates to a device for translating from one series of code designations to another, and more particularly to apparatus for converting from Gray code to binary code or vice versa.

The original data supplied to digital computers is often derived from the rotational position or angular velocity of an instrument shaft. This type of data, called analog data, is frequently translated to a code which is a variation of the ordinary binary code and is referred to as the Gray or reflected binary code. The reflected code is so arranged that only one digit changes in going from any numerical representation to the next, as explained in detail in Patent 2,632,058, issued to F. Gray on March 17, 1953. This effect of a single digital change in the transition of one quantum step to the next represents a unique advantage afforded in the use of the Gray code. Conversion from analog data to Gray code digital data is frequently an early procedure in digital computers. Various methods may be utilized in converting from analog to Gray code data, including optical code wheels and others, none of which will be discussed herein as they are not essential to an understanding of the present invention.

After the translation from analog to Gray code digital data, it is often required to translate the Gray code to ordinary binary code, and supply the latter to the digital computer, since computing and decoding in Gray code are not possible by the usual binary circuit configurations.

It is an object of this invention, therefore, to translate from Gray to binary code simply and rapidly, using reliable and economical components.

Another object of this invention is to translate specified portions of code data from Gray to binary and to transmit unchanged other specified portions of the data.

An additional object of this invention is to provide for translation from binary code to Gray code.

A further object of this invention is to provide alternate translation from Gray code to binary code or from binary code to Gray code.

The invention accomplishes these and other objects by utilizing a multistage transistor shift register in which a gate translator is interposed between the final two stages. The circuit configuration is such that the gate translator serves to compare the binary conditions stored in the final stage and in the stage immediately preceding. If these conditions are similar, a given binary condition is transferred into the final stage, if these conditions are dissimilar, an opposite binary condition is transferred to the final shift register stage. This serves to convert from Gray or reflected binary code to binary code.

The translation is accomplished in serial form by initially reading all of the Gray code data in parallel fashion into the shift register stages. Subsequently, the information in each stage is shifted along step by step into the final stage, the translation being accomplished en route. The output of the final stage constitutes the binary code representation of the Gray code initially stored in the shift register stages.

Another embodiment of the invention includes an alternative gate translator device adapted for interposition between the final two stages of the shift register and comprises passive circuit elements including varistors, capacitors and resistors which operate to make a comparison of the nature of the binary conditions stored in the final two stages as described above.

A further embodiment features a binary counter connected to the output of, or used in lieu of, the final shift register stage for code translation.

Still another embodiment of the invention includes a device which, by the addition of another stage connected to the gate translator interposed between the final two stages, is capable of translating in either direction, i.e., from Gray code to binary code or from binary code to Gray code.

The nature of the invention may be further understood by reference to the attached specification, appended claims and accompanying drawings, in which:

Figure 4:
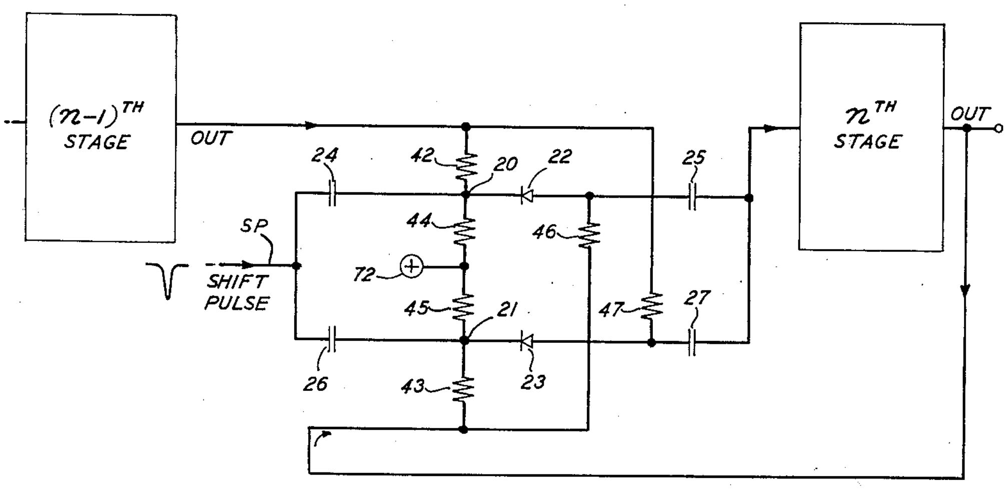
Figure 5:
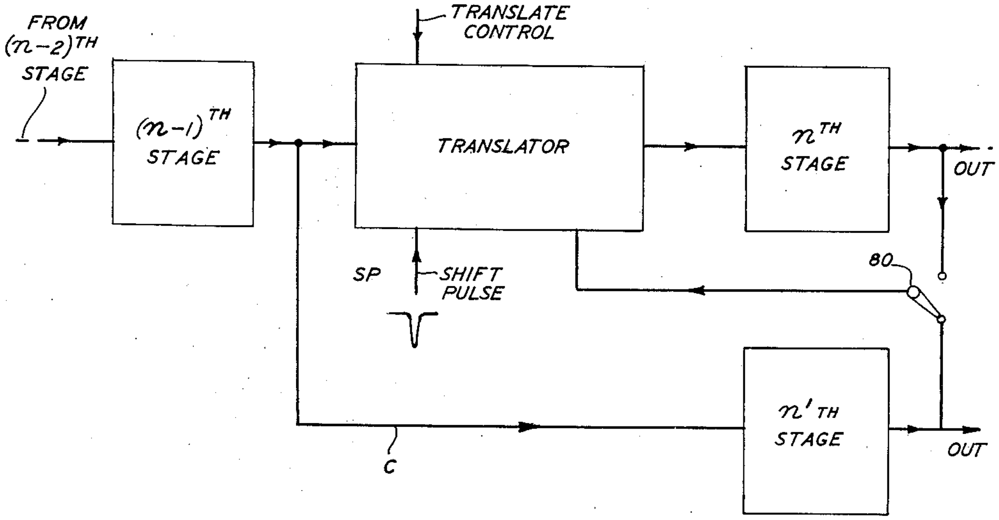
Figure 6:
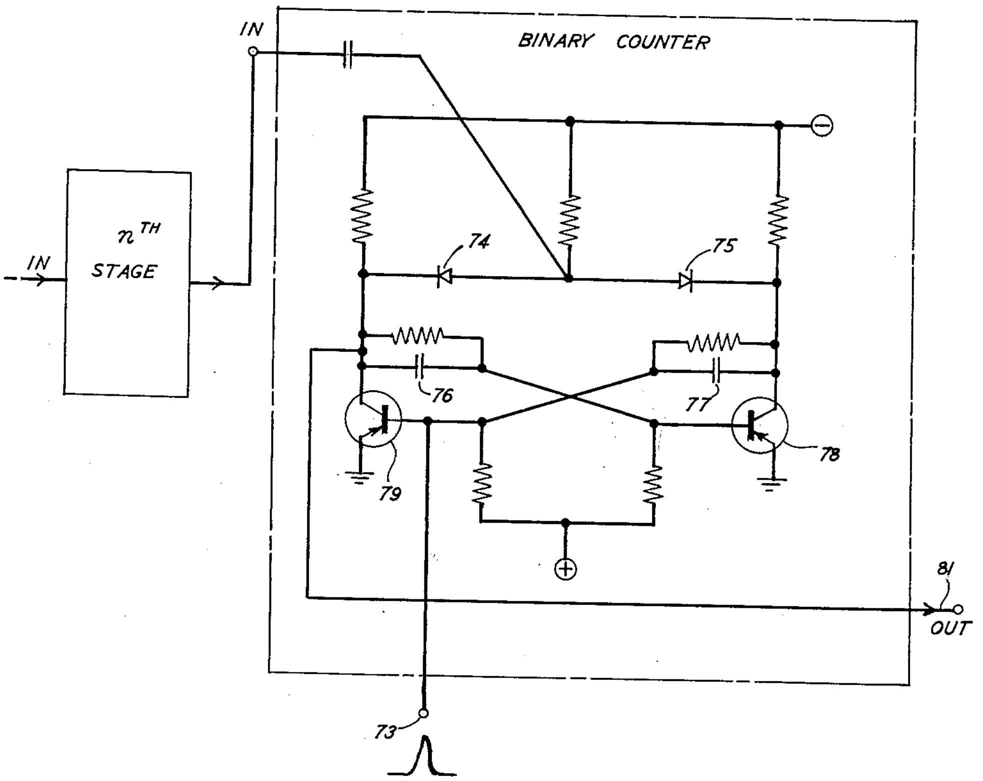

Fig. 4 includes a circuit arrangement for a gate translator which may be used alternatively with the gate translator of Fig. 1;

Fig. 5 shows in outline form a circuit arrangement adapted for translating from Gray to binary code or vice versa, incorporating an additional or a second final stage; and Fig. 6 shows a circuit for code translation featuring a binary counter.

In the following discussion, in accordance with convention, the "$n$th most significant digit" denotes the digit counted from the highest order in the direction of decreasing significance. For example, in the binary number 1011, the $n$th most significant digit, where $n=3$, corresponds to the underscored "1."

The shift register stages, however, are designated from left to right as 1, 2, . . . $(n-1)$ and $n$, where $n$ is the final shift register stage. At the start of each translation operation the most significant digit is read into the $n$th stage, the next highest significant digit into the $(n-1)$th stage, etc., the least significant digit being read into the initial stage.

Figure 1A:
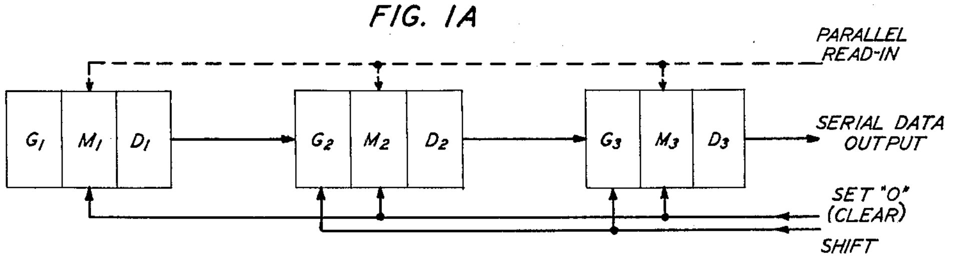
Fig. 1A shows in outline form the principles of operation of a type of shift register which may be utilized in conjunction with applicants' invention.

Referring now to Fig. 1A, the principles of operation of a type of shift register which may be utilized in conjunction with applicants' invention are illustrated. Each stage of the shift register includes a gate G—, memory M— and delay circuit D—. The stages unite the functions of gating, memory and delay in a single entity, but for clarity of explanation, these functions are shown separately in Fig. 1A. The memory portion of the stage may be a single transistor flip-flop circuit which is capable of remembering a binary "0" or a binary "1" condition. A shift register may be composed of any desired number of these stages in tandem.

At the start of the process of shifting information, data is parallel read, or fed, into the memory stages M— of the shift register. This is illustratively accomplished in the circuit of Fig. 1B by applying negative pulses to the base of the transistor in those stages in which a binary "1" condition is to be stored. A "0," in effect, is read into a memory stage by failing to read in a "1," it being assumed that all of the memory elements are initially in the "0" condition, or driven thereto by a set "0" pulse, explained herein. Sufficient time is then permitted to elapse to allow the associated delay stages to assume the state of the corresponding memory stage. Subsequently, a clear or a set zero pulse is applied to the memory stages to change all of the memory stages to a binary "0" condition, readying them for the reception of shifted data. The set "0" is physically accomplished in the circuit of Fig. 1B by transmitting, from a low impedance source, a negative pulse to the emitter of the transistor.

A shift pulse follows the set "0" pulse after a short interval, such that the previous data remains in the delay stages. In this physical realization in the circuit of Fig. 1B, the shift pulse comprises a negative pulse, having a duration that is short in comparison to the delay period, applied to the gate G— of each stage. The advent of the shift pulse permits enabling of the gate between each delay and the following memory stage so that the memory stage may take on the state of the preceding delay stage. The gates are operated only by the coincidence of the shift pulse and a positive or binary "1" condition at the input of the gate. After the shift pulse, the gates are again disabled and sufficient time is allowed for the delay stages to assume the same state as the corresponding memory stages. A "0" is, in effect, transmitted between stages by the gate failing to operate.

Figure 1B:
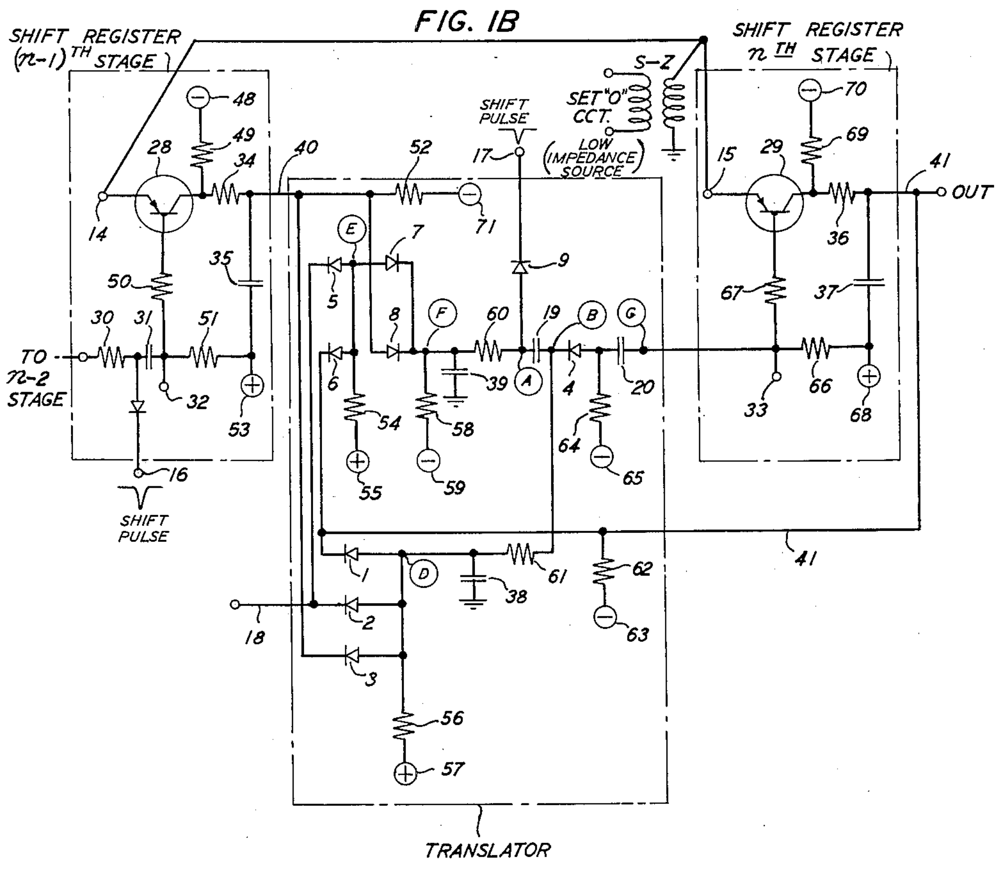
Fig. 1B shows a circuit incorporating the final two stages of a shift register adaptable for use in conjunction with applicants' invention, and a gate translator interposed therebetween.

Referring now to Fig. 1B, a circuit embodiment is therein shown comprising the final two stages of a multistage transistor shift register and the gate translator inteprosed therebetween.

Each of the $(n-1)$th and $n$th stages includes, within the area defined by the dotted lines, apparatus and circuitry for performing the three functions of a shift register stage, namely, gating, memory, and delay. The memory portion of the stage includes the transistor bistable flip-flop elements 28 and 29 capable of storing a "0" or "1" condition. The input gate for the $(n-1)$th stage includes a resistor 30, capacitor 31, and a varistor gate 16, the latter being adapted to receive shift pulses, as indicated. Terminal connections 32 and 33 are available on the base of each of the transistor memory portions for parallel read-in of the coded data. A delay portion including resistance-capacitance elements 34, 35, for the $(n-1)$th stage and 36, 37 for the $n$th stage are available on the output of each memory unit.

It may be seen that no input gate exists in the $n$th stage, and that the output of the translator is connected directly to the base of the transistor flip-flop. In the preceding shift register stages, of which only the $(n-1)$th stage is shown, a portion of the delay function of each stage is coupled with the gate circuit of the following stage. Since the input gate to the $n$th stage is omitted, additional delay is added to the output of the $(n-1)$th stage. Additional delay is also added on the output of the $n$th stage since it is one of the inputs to the translator over lead 41. These delays are obtained from capacitors 38 and 39 at terminals D and F, respectively, of the translator, and from the capacitances 19 and 31 connected to the shift pulse gates. The output over lead 40 of the $(n-1)$th stage constitutes an input to the gate translator. Likewise, an output over lead 41 from the $n$th stage is required as an input to the translator. The remaining two inputs to the translator comprise the shift pulse over lead 17 and the input over translate control lead 18 which is at a higher potential or positive for the translate condition and a lower potential or negative for the non-translate condition. Varistor gating arrangements are provided to establish various conductive and non-conductive paths determined by the translator input conditions. The functioning of the gate translator under various assumed conditions will be described herein.

To demonstrate the functioning of the shift register translator in converting from Gray to binary code, reference to Fig. 1B may be made. Proper translation from Gray to binary requires a comparison of the $n$th most significant Gray digit with the $(n-1)$th most significant binary digit. If they are the same, the input to the $n$th stage is "0," if they are different, it is "1."

The following tabular representation of the steps employed in the Gray to binary conversion may serve to elucidate this principle.

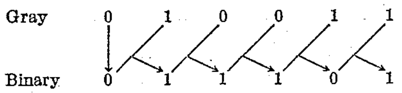

It is seen that the first digit in both codes is the same. The secondary binary digit is determined by a comparison of the second Gray digit with the first binary digit. In this case they are dissimilar and the second binary digit is consequently a "1." If they are similar as in the case of the fifth Gray digit and the fourth binary digit, the fifth binary digit is "0."

It is the function of the gate translator between the final two shift register stags $n-1$ and $n$ to compare the digits in accordance with the foregoing, and to change the input to the $n$ shift register stage when required.

The operation of the translator will be described in all of the possible conditions of registrations in the two shift registers $n-1$ and $n$, of Fig. 1B namely: (*a*) "0" condition in the $n$th stage and a "0" condition in the $(n-1)$th stage, (*b*) a "1" condition in the $n$th stage and a "1" condition in the $(n-1)$th stage, (*c*) a "1" condition in the $n$th stage and a "0" condition in the $(n-1)$th stage, and (*d*) a "0" condition in the $n$th shift register stage and a "1" condition in the $(n-1)$th stage.

*Condition (a)—"0" in the* n*th stage and "0" in the* (n−1)*th stage*

Assuming that the foregoing binary conditions have been parallel read into the memory stages of the shift registers, sufficient time is permitted to elapse to allow the delay portions of the shift register stages to assume the same state as the corresponding memory stages. A clear or a "set-zero" pulse, comprising a negative pulse on the emitters 14 and 15 of the transistors 28 and 29, respectively, from the set-zero supply source S—Z is subsequently applied to the memory stages to ready them to receive shifted data. The shift pulse, applied at terminal 16 of the $(n-1)$th stage and to terminal 17 of the translator follows very soon after the set-zero pulse while the previous data is still in the delay stages. The set-zero pulse will be assumed in the following discussion to have occurred at the appropriate period without further mention thereof.

Examining Fig. 1B, it may be seen that under the assumed conditions the output of both the $(n-1)$th and the $n$th shift register stages are in the zero or negative condition. Terminal D, which is connected to gates 1, 2 and 3, follows in potential the most negative of the inputs to these three gates. Inasmuch as the input to gate 1 is connected to the output lead 41 of the $n$th shift register stage which we have assumed to be in a zero or negative condition, terminal D will consequently be negative or, for example, −13 volts. (The positive or "1" condition is taken to be −1½ volts and the negative or "0" condition −13 volts. These values are exemplary, however, and others may be more appropriate where different circuit parameters are employed.) Since terminal D is negative, terminal B will likewise be negative and diode gate 4 will be enabled. The bias potential 65 is assumed to be slightly higher in potential than the negative or "0" condition, but lower than the positive or "1" condition, for example −10.5 volts.

Terminal E which is connected to gates 5 and 6 follows in potential the most negative of the inputs to said gates. One of the inputs is the translate control lead 18 which, for the translate condition, is in the positive state, or −1½ volts. The input to gate 6 is in the negative condition since it derives from the output of the *n*th stage. Consequently, terminal E is in the negative or "0" condition.

Terminal F which is connected to gates 7 and 8, by its configuration, is adapted to follow the most positive of the inputs to its associated gates. The input to gate 7 from terminal E has already been established as negative or −13 volts. The input to gate 8 which is connected to the output of the (*n*−1)th shift register stage is also in a negative or "0" condition. Consequently, although terminal F will follow the most positive of the two inputs to gates 7 and 8, since both inputs are negative or −13 volts, terminal F is also negative.

As a result, terminal A is negative and a shift pulse will not be permitted to pass through gate 9 from terminal 17. The shift pulse, which is a negative going pulse having, for example, an amplitude of approximately 8 volts with a base at approximately −3 volts does not go sufficiently negative to overcome the −13 volt bias at the anode side of gate 9, preventing conduction. Thus no pulse can pass to the *n*th stage which, in effect, is equivalent to transferring a "0" binary condition into the *n*th stage.

*Condition (b)—"1" stored in the* n*th stage and "1" stored in the* (n—1)*th stage*

Under these assumptions, terminal D which follows the most negative of the inputs to gates 1, 2 and 3 is at −1½ volts. It may be observed that the inputs to gates 1, 2 and 3 are all positive. This follows since gates 1 and 3 which are respectively connected to the outputs of the *n*th and (*n*−1)th shift register stages are positive. The input to gate 2 which is at translate control potential is also positive. Terminal D therefore is positive or −1½ volts. Similarly terminal B is positive and gate 4 is disenabled. This alone is enough to prevent a "1" from being transferred to the *n*th stage; however, the manner of gate translator functioning will also be described for purposes of clarity.

Terminal E, which follows the most negative of the inputs to gates 5 and 6 is again positive in this instance since the input to gate 5 from the translate control lead is positive, and the input to gate 6 which is actually the output of the *n*th stage, is also positive.

Terminal F is positive as it follows the most positive of the two input gates 7 and 8. Since gate 8 is positive, being the output of the (*n*—1)th shift register stage, terminal F is positive. Likewise terminal A is positive. Consequently a shift pulse applied to terminal 17 will be permitted to traverse gate 9, but will be substantially blocked by gate 4 which is in the non-conducting condition, as the result of the positive or −1½-volt potential on the cathode of gate 4, thereby disenabling it.

*Condition (c)—"1" stored in the* n*th stage and "0" stored in the* (n—1)*th stage*

In this instance the output of the *n*th stage will be in the positive condition, or at −1½ volts. Terminal D which follows the most negative of the inputs to gates 1, 2 and 3 is in a negative condition, since the output of the (*n*−1)th stage is negative, rendering the input to gate 3 negative. Terminal D being negative, it follows that terminal B is negative thereby enabling gate 4.

Terminal E which follows the most negative of the inputs to gates 5 and 6 is positive in this instance since the input to gate 6 (the output of the *n*th shift register stage, is positive and the input to gate 5 (the translate control lead 18) is positive. Terminal F which follows the most positive of the inputs to gates 7 and 8 is also positive since the input to gate 7 is determined by the potential at terminal E which has already been shown to be positive. Consequently junction A is also in the positive condition thereby enabling gate 9 to transmit the negative going shift pulses.

Upon the occurrence of the shift pulse at terminals 16 and 17, a voltage pulse is transmitted through gate 9, condenser 19, gate 4 (which has previously been shown to be enabled) and condenser 20, to the base of the transistor memory stage 29 establishing a "1" or positive condition therein. Thus it has been shown that for the dissimilarity of a "0" condition in the (*n*—1)th shift register stage and a "1" condition in the *n*th shift register stage, upon the occurrence of a shift pulse, a "1" condition will be shifted into the *n*th shift register stage.

*Condition (d)—"1" stored in the* (n—1)*th shift register stage and a "0" stored in the* n*th shift register stage*

The output of the *n*th shift register stage is now in a negative or binary "0" condition. It may be seen therefore that terminal D which follows the most negative of the inputs to gates 1, 2 and 3 is also negative. Terminal D being negative, it follows that terminal point B is also negative and that gate 4 is enabled.

Junction E which follows the most negative of the inputs to gates 5 and 6 is also negative since the input to gate 6 which is derived from the output of the *n*th stage is negative. Terminal F which follows the most positive of the inputs to gates 7 and 8 is, in this instance, positive, since the input from the (*n*−1)th stage to gate 8 is positive. Terminal A is therefore positive and gate 9 is enabled. Thus, upon the occurrence of a negative going shift pulse, at terminal 17, a voltage impulse is delivered through gate 9, condenser 19, gate 4, condenser 20, to the base of the transistor 29 in the *n*th shift register stage, establishing a binary "1" condition therein.

From the foregoing it has been shown that upon the occurrence of dissimilar conditions in the (*n*—1)th and *n*th shift register stages, the advent of a shift pulse will effectuate the transference of a binary "1" condition into the *n*th shift register stage. Also, it has been shown, that the circumstance of similar binary conditions in the two shift register stages will result in the "shifting" of a binary "0" condition into the *n*th shift register stage upon the occurrence of a shift pulse.

When the translate control lead 18 is in the nontranslate or negative condition, terminals D and B remain continuously negative and gate 4 continuously enabled.

Inspection reveals that terminal E will also remain continuously negative and that terminal F will follow the output of the (*n*−1)th stage, in that gate 9 is enabled when the (*n*—1)th stage output is positive, or "1," and gate 9 is disabled when the (*n*−1)th stage is negative or "0." Thus it is seen that the condition of the (*n*—1)th stage will be transferred directly to the *n*th stage without being affected by the gate translator.

A compilation of the electrical parameters which, by way of example, may be employed in connection with the elements of Fig. 1 follows:

| Resistance elements: | Ohms |
|---|---|
| 30 | 7,500 |
| 34 | 470 |
| 36 | 470 |
| 49 | 820 |
| 50 | 510 |
| 51 | 820 |
| 52 | 75,000 |
| 54 | 300,000 |
| 56 | 300,000 |
| 58 | 300,000 |
| 60 | 8,200 |
| 61 | 4,700 |
| 62 | 100,000 |
| 64 | 15,000 |
| 66 | 820 |
| 67 | 510 |
| 69 | 820 |

*Varistors.*—All varistors may be Western Electric type 400A germanium diodes or the like.

| Capacitor elements: | Microfarads |
|---|---|
| 19 | 0.0043 |
| 20 | 0.01 |
| 31 | 0.0022 |
| 35 | 0.03 |
| 37 | 0.03 |
| 38 | 0.003 |
| 39 | 0.0068 |

POTENTIAL SUPPLIES

| Terminals: | Volts |
|---|---|
| 48 | —14 |
| 53 | +4 |
| 55 | +300 |
| 57 | +300 |
| 59 | —150 |
| 63 | —150 |
| 65 | —10.5 |
| 68 | +4 |
| 70 | —14 |
| 71 | —150 |

It may be noted that in the translation of successive groups of digits, it is necessary to deenergize the translate control lead at the time the last digit in a particular group is shifted out. If this is not done, some difficulty may be experienced in attempting to read a "0" into the final stage preparatory to translating the next group of digits.

Figure 2:
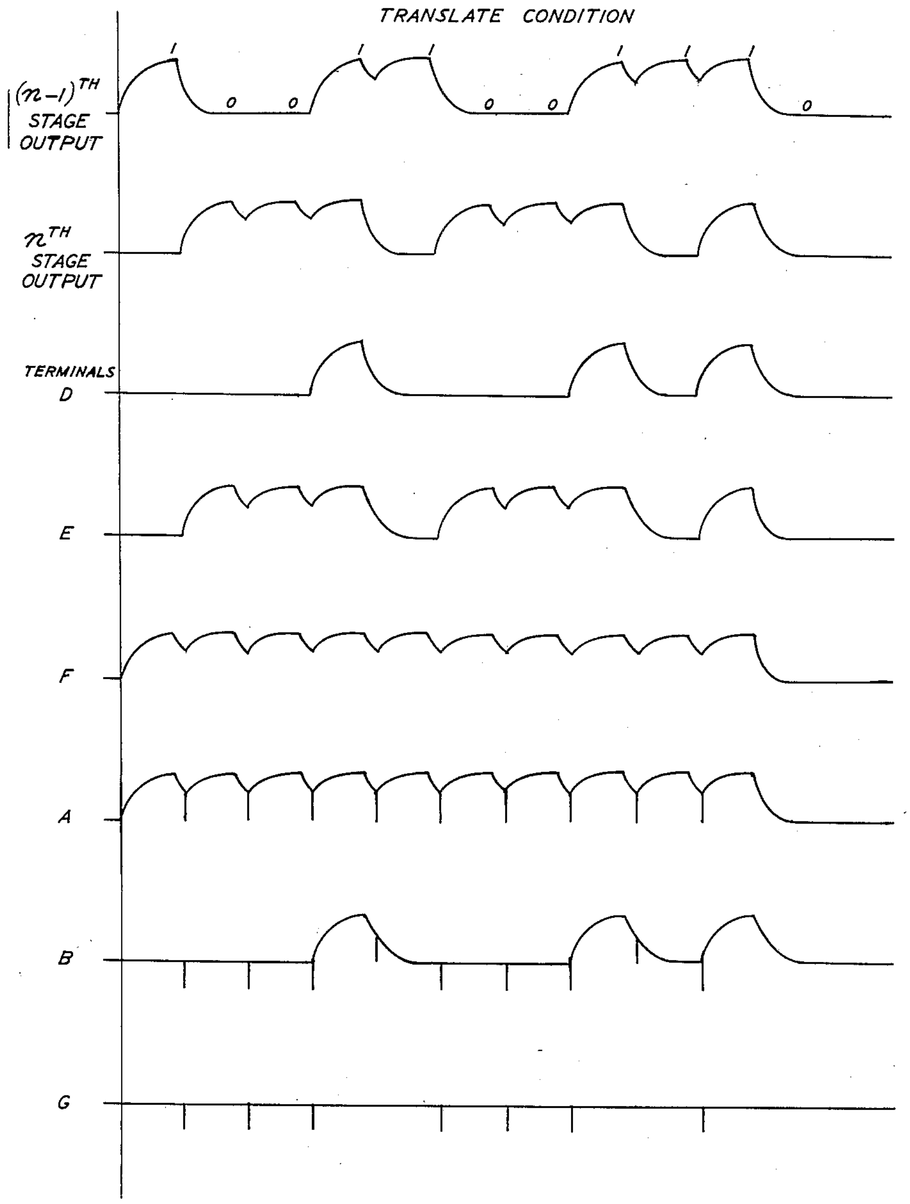
Fig. 2 shows in graphical form, voltage conditions at selected reference locations in Fig. 1, during the translation process.

Fig. 2 demonstrates graphically a typical translation from a Gray to binary series of the Gray number 010011001110. The top wave form represents the output of the $(n-1)$th shift register stage which, in effect, is a repetition of the complete Gray series (most significant digit not shown). The second wave form from the top demonstrates the output of the $n$th shift register stage after the serial translation has been effected. It may be seen that the output of the $n$th shift register stage represents the binary series 011101110100 (least significant digit not shown). Following these two wave forms are graphical representations of the voltage conditions at various points represented in Fig. 1. As has been pointed out previously, the potential at junction D follows the most negative of the varistor connected leads to (*a*) the output of the $(n-1)$th stage, (*b*) the output of the $n$th stage, and (*c*) the translate control.

Similarly, the potential of terminal E follows the most negative of the leads to (*a*) the output of the $n$th stage and (*b*) the translate control.

In this connection it may be pointed out that when the translate control lead is in the translate or positive condition the translate lead is never more negative than the output of the $n$th shift register stage. Thus terminal E follows the potential of the output of the $n$th stage during translation.

The potential at junction F follows the most positive of the varistor connected leads to (*a*) terminal E and (*b*) the output of the $(n-1)$th shift register stage. The wave form at terminal A is similar to that at terminal F with the shift pulses superimposed. That at terminal B is similar to the wave form at terminal D also with the shift pulse superimposed. Junction G will follow only those shift pulses which get through the last gate, i.e., gate 4. Except for the initial read-in, these pulses are the only pulses applied to the base of the transistor 29 which triggers the flip-flop to the "1" condition.

Figure 3:
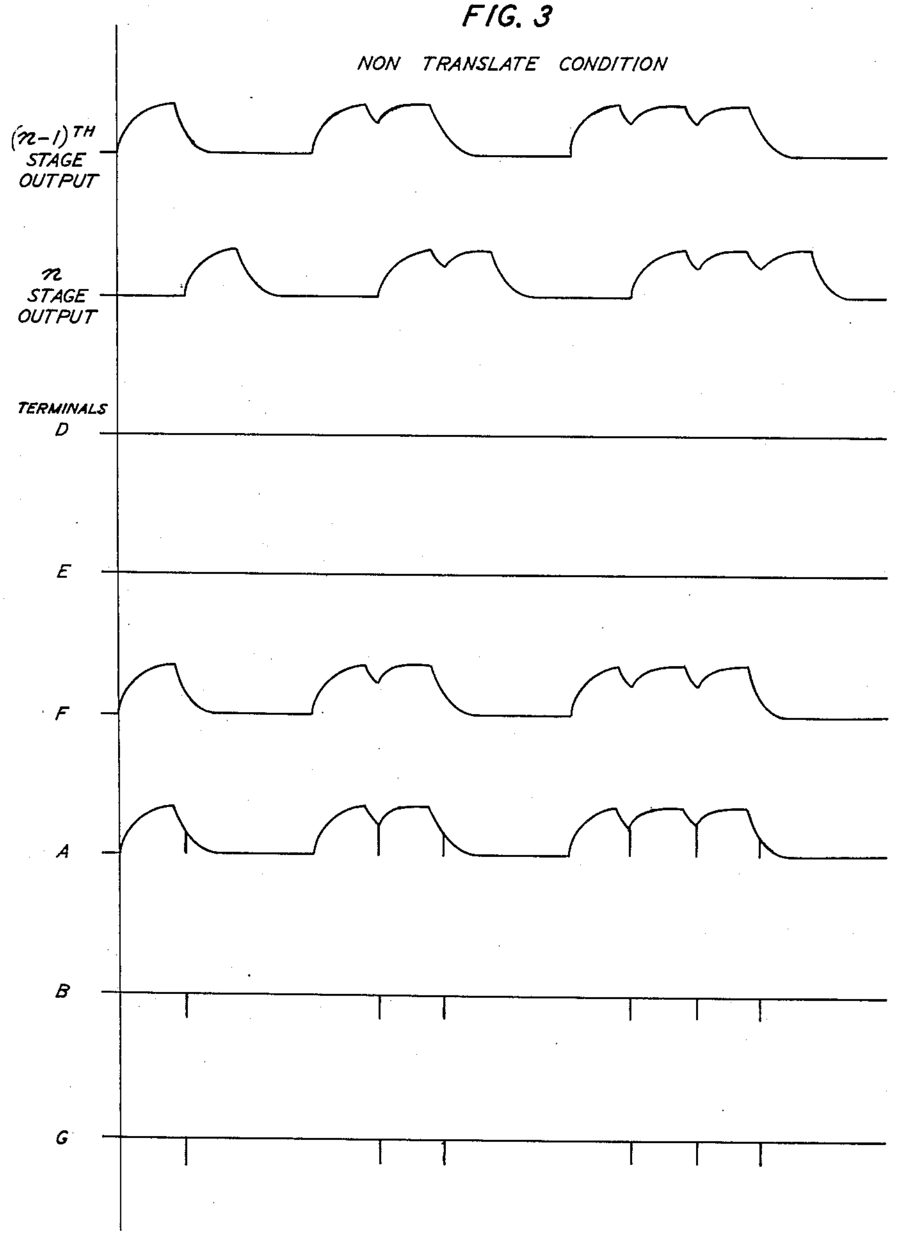
Fig. 3 shows similar graphical indications of potential levels at identical reference locations to those of Fig. 2 for the non-translate condition.

In a similar manner for the non-translate condition, the voltage wave forms for the Gray number 010011001110 are shown in Fig. 3. The translate lead is maintained in the negative or —13 volt condition in this instance.

An alternative form of gate translator which may be employed where the translate control function is not essential is shown in Fig. 4. This type of translator will also function to deliver a pulse to the last shift register stage, or "$n$th" stage, if the binary conditions in the two stages are dissimilar and no pulse if similar conditions prevail. To demonstrate the functioning of this type of translator, various input conditions will be assumed.

The circuit configuration is such that the voltage at terminal points 20 and 21 is relatively higher than the output voltages of the $(n-1)$th and $n$th shift register stages, respectively. Hypothesizing for the purposes of this explanation that the output voltages of the $(n-1)$th and $n$th shift registers are —13 volts in the "0" condition and —1½ volts in the "1" condition, it follows that the corresponding voltages at junctions 20 and 21 are —3 volts and +8½ volts, respectively (when utilizing the circuit parameters suggested herein). For other values of circuit parameters different voltages may be obtained which will also permit of successful operation.

First it may be assumed that a "0" condition exists in the $(n-1)$th stage and a "0" condition in the $n$th stage.

Varistor gate 22, as a result, has a —13 volt potential on its anode side and a —3 volt potential on its cathode side, disenabling it. Varistor gate 23 has a —3 volt potential on the cathode side and a —13 volt potential on the anode side and, therefore, is also disenabled. Consequently, gates 22 and 23 are blocked and no pulse will be transmitted through the gate translator to the $n$th stage upon the application of a shift pulse to lead SP.

Now assuming that a "1" condition exists in the "$n$th" shift register stage and a "1" condition exists in the $(n-1)$th shift register stage, it may be seen that the potentials at terminals 20 and 21, respectively, are now each +8½ volts. Varistor gate 22 has a +8½ volt potential on its cathode side and a —1½ volt potential on its anode side and is, therefore, disenabled. Likewise, varistor gate 23 has a +8½ volt potential on its cathode side and a —1½ volt potential on its anode side and is also disenabled. Consequently, no pulse can traverse the circuit.

If a "0" condition is stored in the $n$th shift register stage and a "1" condition in the $(n-1)$th shift register stage, varistor gate 23 will have a —1½ volt potential on its anode side and a —3 volt potential on its cathode side, thereby rendering the gate conductive. Varistor gate 22 will have a +8½ volt potential on its cathode side and —13 volt potential on the anode side and therefore will be rendered non-conductive. Upon the occurrence of a shift pulse on lead SP, a signal may be traced through condenser 26, varistor gate 23, and condenser 27 to the $n$th shift register stage.

Assuming a "1" condition in the $n$th shift register stage and a "0" condition in the $(n-1)$th shift register stage, varistor gate 22 will have a —3 volt potential on its cathode side and a —1½ volt potential on its anode side thereby enabling it. Varistor gate 23 will have a +8½ volt potential on the cathode side and a —13 volt potential on the anode side thereby disenabling it. Consequently, upon the occurrence of the following shift pulse on lead SP, a signal may be traced through condenser 24, varistor gate 22 and condenser 25 to the $n$th shift register stage.

As illustrative of the circuit values which may be advantageously employed in connection with Fig. 4, the following are given by way of example:

| Resistors: | Ohms |
|---|---|
| 42 | 10,000 |
| 43 | 10,000 |
| 44 | 300,000 |
| 45 | 300,000 |
| 46 | 10,000 |
| 47 | 10,000 |

*Varistors.*—All varistors may be Western Electric type 400A germanium diodes or the like.

| Capacitors: | Microfarads |
|---|---|
| 24 | 0.0033 |
| 25 | 0.0033 |
| 26 | 0.0033 |
| 27 | 0.0033 |

| Potential supply: | Volts |
|---|---|
| 72 | +300 |

Referring now to Fig. 5, a circuit configuration is shown including the final two stages of a multistage transistor shift register, the gate translator interposed therebetween, and an additional *n*th stage connected to the output of the $(n-1)$th stage and an input to the translator. A two-position switch 80 is adapted to engage the output lead of the *n*th stage or the output lead of the *n*th stage. When the switch is in the upper position connected to the output lead of the *n*th stage, the functioning of the circuit is such that a comparison of the *n*th and $(n-1)$th stage is made by the translator, and a conversion from Gray to binary code is effected in the manner described heretofore. However, when the switch 80 is in the lower position, a comparison is made by the translator between the output of the $(n-1)$th stage and the output of the *n*th stage. The output of the *n*th stage represents the condition previously stored in the $(n-1)$th stage, since the digit stored in the $(n-1)$th stage is transferred directly over connection C to the *n*th stage without any modification thereof. It may be seen that this comparision between the $(n-1)$th stage and the *n*th stage will effectuate the conversion from binary code to Gray code with the cooperation of the translator shown in Fig. 1 (or that of Fig. 4, if the translate control function is not essential).

Thus it may be seen that when a Gray code series is initially read into the shift register $n-1$ stage, with the switch 80 in the upper position, the output of the *n*th stage is the equivalent binary code and the output of the *n*th stage is the original Gray code. Similarly, if a binary series is initially read into the shift register $n-1$ stage, with the switch 80 in the lower position, the output of the *n*th stage is the equivalent Gray code series and the output of the *n*th stage is the original binary code series.

Referring now to Fig. 6, a circuit embodiment is therein shown which is adapted to translate from Gray to binary code when the most significant digit is shifted out first. This type of circuit is based on a method of translation in which the *n*th most significant binary digit is "1" if there are an odd number of 1's in the first *n* most significant Gray digits, and "0" if there are an even number. A binary counter is shown connected to the output of the final stage. As the digits are shifted out of the register through the binary counter, the counter continually records the fact of an odd number or an even number of 1's that are shifted out. It is understood that the binary counter is reset at the beginning of each series of pulses to be translated by applying a positive going pulse at terminal 73. As a result, the left-hand portion 79 of the flip-flop is in the "off" or "0" condition and the right-hand portion is in the "on" or "1" condition. Diode 75 is thus back-biased by the positive voltage on its cathode side. The following pulse, if it is a positive going pulse, representing a "1" condition will pass through diode 74 which is in the forward or conducting condition, and will apply a positive voltage through capacitor 76 to the base of transistor 78. This positive pulse turns the transistor "off," causing its collector voltage to drop sharply. At the same time the rapid voltage decline acts through capacitor 77 as a negative pulse directed to the base of the left transistor 79, turning it on.

The next positive going pulse representing a binary "1" condition will pass through diode 75, diode 74 being back-biased or in the non-conducting condition, and turn on the right-hand portion of the counter at the same time reestablishing the "off" condition of the left-hand portion. It is seen therefore that an odd number of "1's" passing through the binary counter will generate a series of 1's on the counter output whereas if an even number of "1's" has passed through the binary counter a series of "0's" will be generated at the counter output 81. Considering the translation of the Gray code series 010011001110, it is apparent that as the most significant digit 0 passes through the binary counter, the output 81 of the binary counter will continue to record 0. When the next most significant digit or 1 passes through the binary counter an odd number of 1's has been established in the first *n* most significant Gray digits and therefore a 1 will appear on the output of the binary counter. This "1" condition will continue as the output until the next "1" condition appears on the input independent of the number of 0's that have been shifted out of the register in the interim. The output of the binary counter may be obtained in pulse form by sampling once after each shift pulse.

In this respect it may be noted that although the binary counter has been shown at the output of the *n*th shift register stage in Fig. 6, it will be apparent to those skilled in the art that the binary counter may instead be used effectively in place of the *n*th stage; in such case the most significant digit must be read into the left-hand portion 79 of the binary counter at the time of read-in.

It is understood that the specific embodiments shown are illustrative and that various modifications or rearrangements may be made without departing from the scope or spirit of the invention.

What is claimed is:

1. A translator comprising a plurality of shift register stages, arranged in a group, each of said stages including bistable memory means and delay means adapted to temporarily retain the information stored in said bistable memory means, said stages following the initial stage and preceding the final stage including input gating means, means for simultaneously transferring the state of some of said memory means to the next adjacent stage, gate translator means interposed between and responsive to the output of the final two of said stages for controlling the succeeding state of the final stage in said group, means connecting said stages and said gate translator means in tandem, and means for bypassing said translating means whereby the state of each of said stages may be directly transferred without translation.

2. A code translator comprising a plurality of shift register stages arranged in a group, each of said stages including bistable memory means, delay means connected to said memory means and adapted to temporarily retain the information stored in said memory means, said stages following the initial stage and preceding the final stage including input gating means, means for simultaneously transferring the binary condition of some of said stages to the next adjacent stage, said last-mentioned means including means for resetting said memory means to a neutral condition and shifting the conditions previously stored in said memory means while still retained in said delay means to the next adjacent stage in cooperation with said input gating means, comparing means interposed between and responsive to the output from said delay means of the final two stages in said group for controlling the succeeding state of the final stage in said group, means connecting said stages and said comparing means in tandem, and means for controlling said comparing means to directly transfer binary conditions stored in said shift register without translation.

3. A code translator for translating from one series of binary notations to another comprising a plurality of serially connected shift register stages, each of said stages including storage means, means for resetting said storage means, delay means associated with said storage means for momentary retention of the binary condition stored in said storage means after said storage means have been reset, a gate translator device interposed between the final two of said stages responsive to the binary conditions stored therein for controlling the succeeding state of the final shift register stage, said gate translator including a plurality of interconnected varistor gates, translator control means adapted to regulate translation or non-translation of said gate translator connected to said last-mentioned varistor gates, shift pulse potential supply means connected to said input varistor gates and to said gate translator for transferring the state of each of said stages preceding said final two stages to the next adjacent stage, and means for altering the potential on said translate control means for directly transferring the binary condition in each of said storage means to the next adjacent storage means without translation.

4. A code translator as defined in claim 3 wherein said gate translator includes varistor gating means connected to said shift register stage immediately preceding the final stage, varistor gating means connected to said translator control means, and varistor gating means connected to said shift pulse potential supply means, all of said varistor gating means acting cooperatively upon the occurrence of given binary indicia in said final two stages for transferring a given binary condition to said final stage under the control of said shift potential supply means and acting cooperatively to transfer a different binary condition into said final stage upon the occurrence of other predetermined binary indicia in said final two stages.

5. A translating device comprising a plurality of two-state storage devices arranged in a group, means for simultaneously transferring the state of each of said storage devices in all devices preceding the final two devices to the next adjacent device, a gate translator interposed between and responsive to the operation of the final two of said storage devices in said group to a particular state for controlling the succeeding state of the final storage device in said group, said gate translator including two varistor gating devices, means connecting a first of said gating devices through impedance means to said stage immediately preceding said final stage, means connecting a second of said gating devices through impedance means to said final stage, means connecting said first and second gating device through condenser means to said means for simultaneously transferring the state of each of said storage devices, means connecting said first and second gating devices through impedance means to a positive potential supply, said gating devices being adapted to cooperatively transfer a pulse through one or the other of said devices upon the occurrence of given binary indicia in said final two stages and to transfer no pulse upon the occurrence of other binary indicia in said final two stages, and means connecting said two-stage storage devices and said gate translator in tandem.

6. A code translator comprising a plurality of shift register stages arranged in a group, each of said stages including bistable memory means and delay means adapted to temporarily retain the information stored in said bistable memory means, said stages following the initial stage and preceding the final stage including input gating means, parallel read-in means for storing in said memory means the binary conditions to be translated, resetting means for clearing said memory means and readying said memory means for reception of shifted data, means acting in cooperation with said input gating means for simultaneously transferring the state of some of said stages to the next adjacent stage, gate translator means interposed between the final two of said stages and responsive to the output of said final two stages for controlling the succeeding state of the final stage in said group, means connecting said stages and said gate translator means in tandem, translate control means to regulate said gate translator for transferring shifted data directly without translation, switching means connected to said gate translator and connectable to the output of said final stage, and an additional shift register stage connected to said stage immediately preceding said final stage and connectable to said switching means, whereby a particular type of binary translation is effected upon the connection of said switching means to said final stage and another type of binary translation is effected upon the connection of said switching means to said additional shift register.

7. A code translating device comprising a plurality of shift register stages connected serially in a group, each of said stages including bistable memory means and delay means adapted to temporarily retain the information stored in said bistable memory means, said stages following the initial stage including input gating means, means for simultaneously transferring the state of each of said memory means to the next adjacent stage, a binary counter connected to the output of said final stage, said binary counter comprising two transistor storage devices, varistor gating means connected to the emitters of said transistors, and means connecting the anodes of said varistors to said final stage, whereby the transfer of a particular binary condition out of said final stage into said binary counter will result in the energization of a first of said transistor storage devices and the deenergization of a second of said transistor storage devices, and the subsequent transference of a similar binary condition from said final shift register stage will result in the deenergization of said first transistor device and the energization of said second transistor device.

8. A gating circuit comprising two diode gating devices, two bistable controlling devices, signaling means, means connecting a first of said diode gating devices through impedance means to a first of said bistable devices, means connecting a second of said gating devices through impedance means to a second of said bistable devices, means connecting said first and second gating devices through condenser means to said signaling means, means connecting said first and said second gating devices through impedance means to a positive potential supply, and means connecting said first gating device to said second bistable device and said second gating device to said first bistable device, said gating devices being adapted to cooperatively transfer a pulse from said signaling means through one or the other of said gating devices upon the occurrence of given binary conditions in said bistable devices and to transfer no pulse upon the occurrence of other binary conditions in said bistable devices.

9. A gate translator device comprising two varistor gates, two bistable devices, a signaling device connected to said varistor gates, means connecting a first of said bistable devices to the cathode of a first of said varistor gates and a second of said bistable devices to the cathode of a second of said gates, means connecting the cathodes of said varistor gates through impedance means to a positive potential source, means connecting the anode of said first varistor gate through impedance means to said second bistable device and the anode of said second varistor gate through impedance means to said first bistable device whereby the coincidental occurrence of similar states in said bistable devices will disenable said varistor gates and the coincidental occurrence of dissimilar states in said bistable devices will enable one of said gates.

10. An electrical circuit comprising a plurality of two-state control devices having input and output means; a plurality of varistor gating means having input and output means; and means for enabling one of said gating means operative responsive to the presence of concurrent dissimilar states at said output means of two of said control devices and for disabling all of said gating means operative responsive to the presence of concurrent similar states at said output means of said two control devices, said means for enabling and disenabling said gating means including means connecting said output means of said two control devices to said input means of said gating means, means for supplying an operating signal to said input means of said gating means, and means connecting said output means of said gating means to said input means of one of said two control devices.

References Cited in the file of this patent

UNITED STATES PATENTS

| | | |
|---|---|---|
| 2,557,729 | Eckert | June 19, 1951 |
| 2,571,680 | Carbray | Oct. 16, 1951 |
| 2,632,845 | Goldberg | Mar. 24, 1953 |
| 2,636,133 | Hussey | Apr. 21, 1953 |
| 2,755,459 | Carbrey | July 17, 1956 |
| 2,758,788 | Yeager | Aug. 14, 1956 |
| 2,762,564 | Samson | Sept. 11, 1956 |
| 2,781,447 | Lester | Feb. 12, 1957 |
| 2,810,518 | Dillon et al. | Oct. 22, 1957 |
| 2,811,713 | Spencer | Oct. 29, 1957 |